United States Patent [19]

Adams

[11] 4,186,615
[45] Feb. 5, 1980

[54] STEERING GEARS

[75] Inventor: Frederick J. Adams, Clevedon, England

[73] Assignee: Cam Gears Limited, Hitchin, England

[21] Appl. No.: 821,473

[22] Filed: Aug. 3, 1977

[30] Foreign Application Priority Data

Aug. 6, 1976 [GB] United Kingdom ............... 32901/76

[51] Int. Cl.² ............................................. B62D 3/08
[52] U.S. Cl. .............................. 74/89.15; 74/424.8 R; 74/499
[58] Field of Search ........ 74/89.15, 424.8 R, 424.8 A, 74/424.8 VA, 424.8 NA, 499, 509, 498, 500; 91/380; 251/264; 180/79, 151

[56] References Cited

U.S. PATENT DOCUMENTS

| 1,890,524 | 12/1932 | Martin, Jr. | 251/264 X |
| 3,033,051 | 5/1962 | Reinke et al. | 74/388 |
| 3,207,468 | 9/1965 | Lauducci et al. | 251/58 |
| 3,209,610 | 10/1965 | Wicklin, Jr. | 74/424.8 |
| 3,250,147 | 5/1966 | Barton et al. | 74/509 |
| 3,606,801 | 9/1971 | Williams | 74/424.8 R |
| 3,824,905 | 7/1974 | Jablonsky | 74/89.15 X |
| 3,972,248 | 8/1976 | Adams | 74/498 |

FOREIGN PATENT DOCUMENTS

| 2223527 | 5/1972 | Fed. Rep. of Germany | 74/498 |
| 609358 | 3/1947 | United Kingdom | 74/498 |

Primary Examiner—Allan D. Herrmann

[57] ABSTRACT

An improved steering apparatus is utilized to turn a steerable wheel of the vehicle. The apparatus includes an axially movable push rod or force transmitting member which is connected with the steerable wheel of a vehicle. A screw thread is formed on the push rod and cooperates with a nut which is rotated by a bevel gear connected with an input member. In order to effect a change in the steering ratio, a cam track is formed in the push rod. A cam follower or pin cooperates with the track to effect rotation of the push rod relative to the nut as the push rod is moved axially due to the rotation of the input member and nut.

14 Claims, 1 Drawing Figure

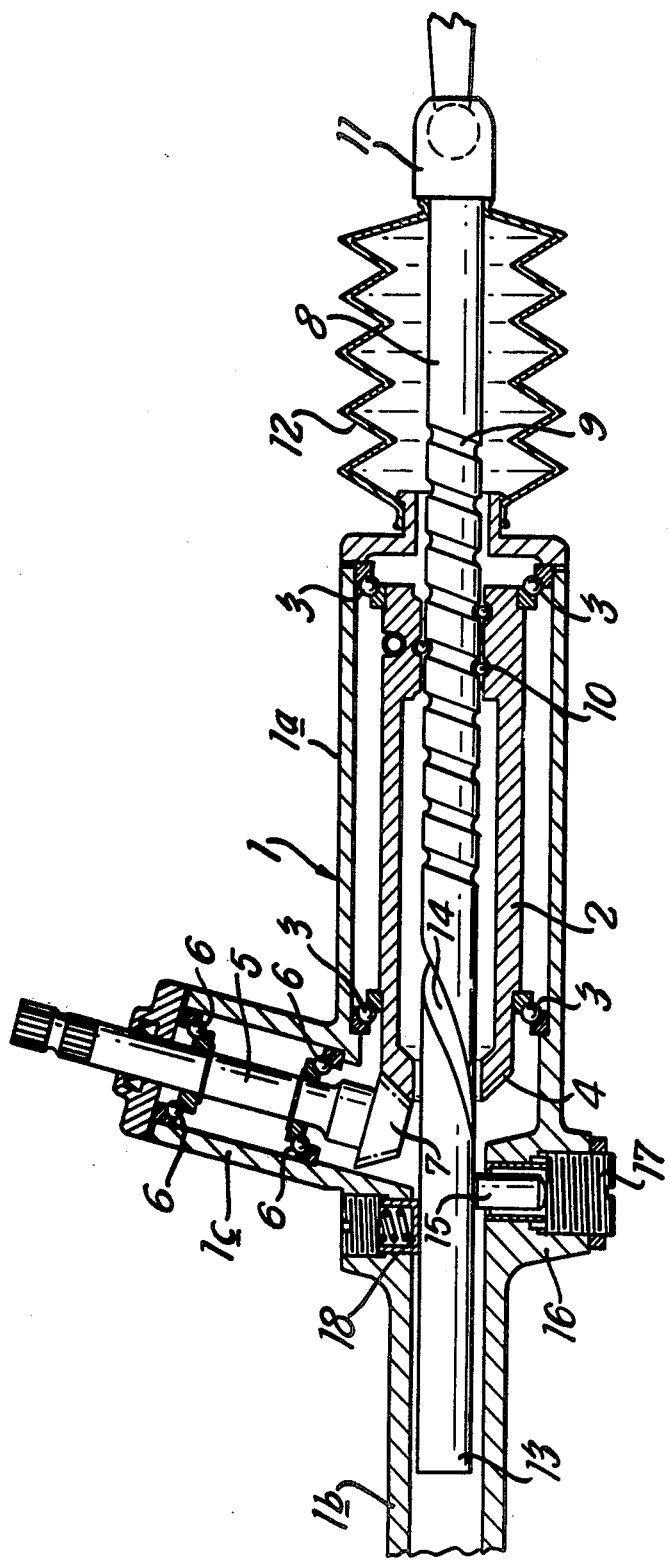

STEERING GEARS

This invention relates to steering gears and primarily to such a gear as is suitable for motor vehicles.

More particularly, the invention concerns a steering gear of the push rod kind (hereinafter referred to as "the kind specified") in which a longitudinally extending push rod member is mounted for longitudinal displacement in a housing member and is intended to provide a steering output in response to its longitudinal displacement relative to the housing member; the push rod member has a screw threaded part to which is drivingly connected a nut so that, upon rotation of the nut relative to the housing member, the push rod member is intended to exhibit longitudinal displacement; there being provided means for rotating the nut in response to a steering input and means for restraining the push rod member from freely rotating relative to the housing member during rotation of the nut.

In use of a steering gear of the kind specified, the push rod member is coupled to the steerable road wheels of a vehicle while the means for rotating the nut is coupled to a driver steerable component so that, upon adjustment of the steerable component, the nut is rotated to impart longitudinal displacement to the push rod member and thereby a change in steering is effected. The steering effect upon the road wheels is therefore in direct relationship to the longitudinal displacement which is exhibited by the push rod member as a result of the nut, when rotating, driving the push rod member. Hitherto, due to the driving engagement between the nut and push rod member the longitudinal displacement exhibited by the push rod member has been directly proportional to the rotation exhibited by the nut so that, irrespective of the position of engagement between the nut and push rod member in the range of such engagement, for a particular amount of rotation of the nut the longitudinal displacement of the push rod member which resulted therefrom has been the same. The effect of this is that in hitherto proposed push rod steering gears the steering ratio between the input (resulting in rotation of the nut) and the output (which results from the longitudinal displacement of the push rod member) has been constant throughout the overall displacement of which the push rod member is capable and it is an object of the present invention to provide a steering gear of the kind specified in which the aforementioned ratio may be varied within or throughout the longitudinal displacement of which the push rod member is capable.

According to the present invention there is provided a steering gear of the kind specified in which the push rod member is restrained from exhibiting rotation relative to the housing member during its longitudinal displacement by a track follower on one of said members slidably engaging and following a longitudinally extending track on the other said member, and wherein at least part (hereinafter referred to as a "control part") length of the track extends in a direction other than parallel to the direction in which push rod member is longitudinally displaced so that, during longitudinal displacement of the push rod member and while the track follower is moving along the control part of the track, the push rod member exhibits controlled rotation relative to the housing member and thereby effects a change in the steering ratio between the longitudinal displacement of the push rod member and rotation of the nut as compared with such ratio as would be derived by the track follower moving along a rectilinear track part which extends parallel to the direction of longitudinal displacement of the push rod member or along a further control part length the track having a different configuration or orientation than that of the first mentioned control part.

By the present invention the push rod member, for a given amount of rotation of the nut, is capable of exhibiting controlled rotation relative to the housing member for at least part of its permissible longitudinal displacement and as such, when the push rod member is exhibiting controlled rotation under the influence of the rotating nut, the longitudinal displacement of the push rod member may be reduced or increased in comparison with such longitudinal displacement of the push rod member as would be derived from the same given amount of rotation of the nut and, for example, with no rotation of the push rod member. Consequently by appropriate design in the longitudinal configuration of the track shape and/or the orientation of the, or part of the, track extent relative to the direction in which the push rod member is displaced, the steering ratio provided by the gear can be varied (continuously or intermittently as required) throughout the permissible longitudinal displacement of the push rod member. It is therefore intended that the configuration of the track will vary over its longitudinal extent and such configuration may include one or more rectilinear control part lengths which are out of parallel with the direction of push rod member displacement and/or one or more non-rectilinear control part lengths. It is envisaged that a non-rectilinear control part of the track will usually be of helical configuration; for example, the whole length of the track may be of helical configuration in which the pitch of the helix varies over its extent in accordance with the variation in steering ratio which is to be provided.

As will be realised the relationship between the nut, the means for rotating the nut, the driving engagement between the nut and the push rod member, and the configuration of the track will be selected in accordance with a predetermined mechanical advantage which is to be provided between the input and the output of the steering gear but is variable at at least two different regions of sliding engagement between the track and track follower.

In a preferred embodiment the track is in the form of an appropriately shaped channel in the surface of the push rod member (this is convenient since it facilitates machining of the push rod) and the track follower is in the form of a peg or roller stationarily mounted on the housing (or an extension thereof) to engage in and follow the channel. Alternatively however the track may be located on the housing member (or an extension thereof) while an appropriate track follower is provided on the push rod member, for example the track can be in the form of a helical rib extending radially inwardly from a cylindrical wall of the housing member and within the confines of which wall is co-axially located the push rod member, the latter being provided with a bifurcated track follower which straddles the rib and restrains the push rod member from exhibiting rotation other than that as determined by the control part of the track.

Rotation of the nut may be effected in any convenient manner either directly (for example as a direct result of adjustment of a steerable component) or indirectly (for example through a gear system such as a rack and pinion, a bevel gear arrangement or a meshing helical skew gear arrangement in a manner which is the subject of our co-pending Application No. 32902/76).

The steering gear may include means by which power assistance can be provided for displacement of the push rod member, for example by forming the push rod member as, or as part of, a piston rod for a piston in a fluid pressure operated double acting piston and cylinder device the control of fluid pressure to which is achieved by a valve mechanism adjustable in response to variations in steering input to the steering gear; such a power assistance arrangement along with others which may be applied to a push rod steering gear of the kind specified are well known in the relevant art (for example U.K. Patent Specification No. 1,364,021) and as such are not further discussed.

The driving engagement between the nut and threaded part of the push rod member is preferably by way of a recirculating ball mechanism although other forms of driving engagement may be used, as convenient, for example a sliding thread engagement.

One embodiment of a push rod steering gear of the kind specified and constructed in accordance with the present invention will now be described, by way of example only, with reference to the accompanying illustrative drawing which shows a longitudinal section through the gear.

The steering gear has a housing 1 which consists of a cylindrical main body 1a, a tubular part 1b which extends from and is generally co-axial with the body 1a and a tubular cylindrical branch portion 1c the axis of which subtends an acute angle with the axis of the body 1a. Co-axially located within the main body 1a is a tubular nut 2 which is rotationally mounted relative to, and restrained from both axial and radial displacement in, the housing body 1a by bearings 3. The nut or force transmitting member 2 is provided with a bevel gear 4 on an end thereof in the region of the housing portion 1c. Located in and extending from the housing portion 1c is a steering shaft or drive member 5 which is rotatably mounted relative to, and restrained against axial and radial displacement in, the housing portion 1c by bearings 6. The end of the shaft 5 extending from the housing is intended to be coupled to a steerable component (such as a steering wheel) in conventional manner while the other end of the shaft 5 is provided with a force input pinion or bevel gear 7 which is in meshing engagement with the annular array of bevel gear teeth 4. Consequently, upon rotation of the shaft 5 rotation is imparted to the nut 2 by forces transmitted through the bevel gears 4 and 7.

Received within and extending through the nut 2 is a cylindrical push rod or driven member 8 having a screw threaded part 9. The screw thread 9 is drivingly connected to the nut 2 through a recirculating ball mechanism 10 located at the end of the nut 2 remote from the bevel gear 4. By this drive arrangement, if the nut or tubular drive member 2 is rotated while the push rod 8 is restrained from sympathetic rotation therewith, the push rod will be displaced longitudinally (axially of the housing 1a) to provide a steering output. Such output is utilised in conventional manner by an end 11 of the push rod 8 which extends from the housing 1 being coupled in conventional manner to steerable road wheels so that the latter are adjusted in response to displacement of the push rod which functions as a drive member to turn the wheels. Tubular bellows 12 are connected between the outer end 11 of the push rod and the housing 1 to alleviate the likelihood of extraneous matter entering the mechanism, (Particularly the ball thread). Displacement of the inner end 13 of the push rod is accommodated within the housing extension 1b.

Provided in the surface of the push rod 8 over a part length thereof remote from the screw thread 9 is a track in the form of a longitudinally extending channel or cam track 14. Engaging in the channel 14 to be longitudinally slidable relative to the push rod is a pin or follower 15 stationarily mounted in a boss 16 on the housing 1. A screw cap 17 retains the pin 15 in the housing. The engagement between the pin 15 and channel 14 restrains the push rod 8 from freely rotating relative to the housing part 1a during longitudinal displacement of the push rod and while the pin 15 slides within the channel 14. A spring loaded plunger 18 is mounted in the housing 1 to slidably engage the push rod 8 on the side thereof remote from the pin 15 and to bias the push rod so that the channel 14 and pin 15 are urged into engagement.

In accordance with the present invention the channel 14 has a control part of its longitudinal extent of non-rectilinear formation, more particularly of helical formation is illustrated in the drawing. The channel 14 extends from the helical control part illustrated towards the inner end 13 of the push rod and this further longitudinal extent of the channel (not illustrated) may be (a) of rectilinear form parallel with the direction of longitudinal displacement of the push rod or (b) of a form which constitutes a further control part length of the channel, for example of rectilinear form which is out of parallel with the axis of the nut 2 or of non-rectilinear form (possibly so that the overall longitudinal extent of the groove is of varying pitch helical configuration). By this arrangement when the push rod 8 is undergoing longitudinal displacement as a result of the nut 2 being rotated, the push rod will not exhibit rotation relative to the housing 1a if, and for so long as, the pin 15 is sliding within a rectilinear part length of the channel 14 which part length is parallel to the axis of the nut 2; however, upon the pin 15 entering and sliding along a control part length of the channel 14 which is of non-rectilinear form or is of rectilinear form out of parallel with the axis of the nut 2, then the engagement between the pin and channel imparts controlled rotation to the push rod 8 while the nut 2 is rotating. As a consequence of this latter effect the longitudinal displacement of the push rod 8 which results from controlled rotation of the push rod simultaneously with rotation of the nut 2 will, for a given amount of rotation of the nut 2, be varied in comparison, for example, with the longitudinal displacement exhibited by the push rod for the same given amount of rotation of the nut 2 but when the push rod is not exhibiting controlled rotation relative to the housing 1a. By appropriate configuration of the longitudinal form presented by the channel 14 therefore, for a given amount of rotation of the shaft 5 the resultant longitudinal displacement of the push rod 8 can be varied at predetermined regional positions of the push rod relative to the housing 1 and so the steering ratio provided between the longitudinal displacement of the push rod 8 and the rotation of the input shaft 5 can be varied.

In addition to the advantage of providing a relatively uncomplicated form of variable ratio steering gear, the present invention provides the advantage that the characteristics of the steering gear ratio variability can be changed for a particular steering gear merely by removing the existing push rod and replacing it with a similar push rod but having a channel 14 of different longitudinal configuration.

What we claim is:

1. A variable ratio steering apparatus for use in turning a steerable vehicle wheel, said apparatus comprising a first drive member having a longitudinally extending central axis, said first drive member having an end portion adapted to be connected with the steerable vehicle wheel, a second drive member, first force transmitting means for transmitting force from said second drive member to said first drive member to effect movement of said first drive member along its longitudinally extending central axis in response to rotation of said second drive member relative to said first drive member to thereby effect turning movement of the steerable vehicle wheel, said first force transmitting means including an external thread convolution formed on said first drive member and an internal thread convolution formed on said second drive member, input means for rotating said second drive member relative to said first drive member in response to rotation of a manually actuatable member, and second force transmitting means for varying the speed of movement of said first drive member along its longitudinally extending central axis during rotation of said second drive member to vary the rate of turning movement of the steerable vehicle wheel, said second force transmitting means including means for varying the speed of relative rotation between said first and second drive members during rotation of said second drive member.

2. An apparatus as set forth in claim 1 wherein said input means for rotating said second drive member relative to said first drive member includes a pinion gear adapted to be rotated in response to rotation of the manually rotatable member and an annular array of gear teeth connected with said second drive member and disposed in meshing engagement with said pinion gear.

3. An apparatus as set forth in claim 1 wherein said second force transmitting means includes a cam surface and a follower which are connected with said first drive member, said cam surface and follower interacting to effect rotational movement of said first drive member during movement of said first drive member along its longitudinally extending central axis.

4. A variable ratio steering apparatus as set forth in claim 1 wherein said second drive member includes surface means for defining a passage which extends through at least a portion of said second drive member, said first drive member extending into said passage in said second drive member.

5. A variable ratio steering apparatus as set forth in claim 4 wherein said internal thread convolution is disposed in the passage in the second drive member.

6. A variable ratio steering apparatus as set forth in claim 5 wherein said second force transmitting means includes a cam surface connected with said first drive member and a follower disposed in engagement with said cam surface.

7. A variable ratio steering apparatus as set forth in claim 1 wherein said second force transmitting means includes a cam surface which is formed on said first drive member as a continuation of said external thread convolution and a cam follower disposed in engagement with said cam surface.

8. A variable ratio steering apparatus for use in turning a steerable vehicle wheel, said apparatus comprising a longitudinally extending push rod member which is movable along its longitudinal central axis, one end portion of said push rod member being adapted to be connected with the steerable vehicle wheel, a tubular force transmitting member connected with said push rod member, said push rod member extending through a passage formed in said tubular force transmitting member, input means for rotating said tubular force transmitting member to effect axial movement of said push rod member, said input means including an annular array of gear teeth disposed on said tubular force transmitting member and a pinion gear disposed in meshing engagement with said annular array of gear teeth, and control means for effecting a variation in the rate of axial movement of said push rod member to thereby vary the rate of turning movement of the steerable vehicle wheel, said control means includes a cam surface and a follower disposed in engagement with said cam surface, one of said cam surface and follower being movable axially with said push rod member, said cam surface and follower being effective to cause rotation of one of said members about the longitudinal central axis of said push rod member during at least a portion of the axial movement of said push rod member.

9. An apparatus as set forth in claim 8 further including means for supporting said tubular force transmitting member for rotation about the longitudinal central axis of said push rod member.

10. An apparatus as set forth in claim 9 further including means for supporting said push rod member for rotation about its longitudinal central axis.

11. An apparatus as set forth in claim 10 wherein said cam surface and follower cooperate to rotate said push rod member about the longitudinal central axis of said push rod member to effect a variation in the rate of axial movement of said push rod member during rotation of said tubular force transmitting member under the influence of said input means.

12. An apparatus as set forth in claim 9 further including force transmitting means for transmitting drive forces between said tubular force transmitting member and said push rod member, said force transmitting means including an internal thread convolution formed in the passage through said tubular force transmitting member and an external thread convolution formed on the outside of said push rod member.

13. An apparatus as set forth in claim 12 wherein said cam surface is formed in said push rod member as a continuation of said external thread convolution.

14. A variable ratio steering apparatus for use in effecting turning movement of a steerable vehicle wheel, said apparatus comprising a longitudinally extending push rod member movable along its longitudinal central axis to transmit an axially directed force, said push rod member being adapted to be connected with the steerable vehicle wheel to effect turning movement of the steerable vehicle wheel under the influence of the axially directed force, a thread convolution fixedly connected with said push rod member, drive means for cooperating with said thread convolution to effect movement of said push rod member along its longitudinal central axis in response to movement of a manually actuatable member, and control means connected with said push rod member for effecting a variation in the rate of movement of the push rod member along its longitudinal central axis to thereby vary the rate of turning movement of the steerable vehicle wheel, said control means including a cam track which is formed as a continuation of said thread convolution.

* * * * *